March 25, 1924.  W. McDONALD  1,488,015
GREEN PEA VINER
Original Filed Jan. 15, 1923

INVENTOR
William McDonald
BY Gustav Rising
ATTORNEY

Patented Mar. 25, 1924.

1,488,015

UNITED STATES PATENT OFFICE.

WILLIAM McDONALD, OF GREEN BAY, WISCONSIN, ASSIGNOR TO CHISHOLM-SCOTT COMPANY, OF COLUMBUS, OHIO, A PARTNERSHIP.

GREEN-PEA VINER.

Application filed January 15, 1923, Serial No. 612,587. Renewed November 24, 1923.

*To all whom it may concern:*

Be it known that I, WILLIAM McDONALD, a citizen of Canada, county of Halton, residing at Green Bay, Brown County, Wisconsin, have invented certain new and useful Improvements in Green-Pea Viners, of which the following is a specification, taken in connection with the accompanying drawings, in which—

Figure 1:
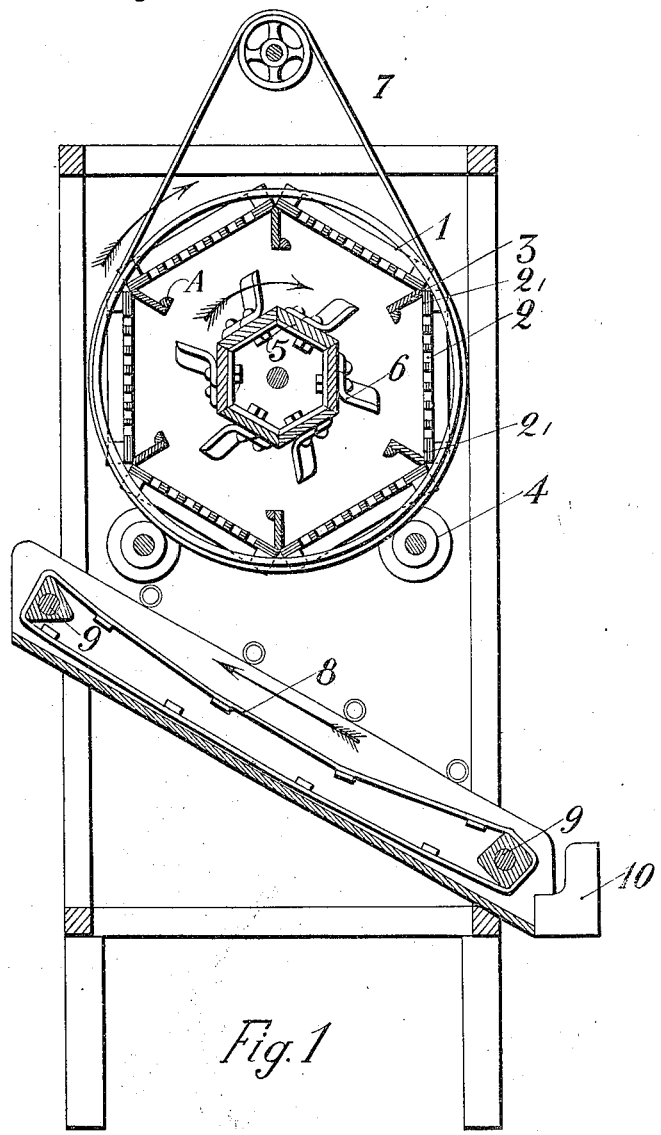
Figure 2:
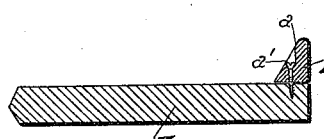
Figure 3:
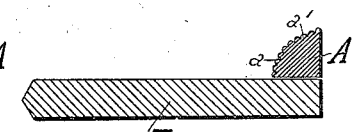

Fig. 1 is a vertical transverse cross section of a green pea viner with my improvement attached and Figs. 2 and 3 are details of the improvement on a larger scale.

As is well known in the art, a machine for hulling the peas from the pods attached to green pea vines as these are brought from the field, called a green pea viner, or viner for short, consists of an outer, slowly-revolving drum 1 mounted on travelers 4 and turned by a sprocket chain 7, which drum is covered with detachable frames 21 carrying sieves 2, usually made of perforated canvas or rubber, and is provided with inwardly projecting elevating ribs 3 with parallel sides projecting radially into the cylinder. At or near the bottom the ribs point or slant upwardly on the elevating side, being the left side of the drum in Fig. 1, and thus carry the vines and attached peas into the upper half of the drum, whereupon the ribs, now slanting downwardly on their elevating side, permit the vines to slide from them and to fall downwardly into the drum. The point in the rotation at which the vines fall from the ribs is determined by their speed of rotation, higher speeds corresponding to higher points of drop, by the breadth of the rib, the broader ribs causing a longer travel across the rib and a consequent higher point of disengagement between rib and vine and by the degree of roughness of the rib and the like.

During their fall, the vines are struck by the more rapidly revolving beaters 6 mounted on the prism 5 which, as shown revolves in the same direction as the drum. The green peas are thus hulled and fall through the sieve 2 onto the upwardly moving apron 8 mounted on rotating polygonal rollers 9, the spherical peas rolling down the apron despite its upward motion, into the collecting pea box 10 whereas any débris or dirt which may have dropped on the apron is dragged upward and falls over its upper edge. The vines which carry the hulled pea shells are however thrown toward the discharge end of the drum 1 because of the slant given to the beaters 6 and eventually fall out of this discharge end onto the straw pile. As a result of these operations, we have the peas in the pea box 10, the particles of débris in a pile below the upper edge of the apron and the threshed out vines at the discharge end of the drum.

My improvement consists in securing a bead or strip A at the inner end, meaning the end nearest the centre of the drum, of the elevating rib 3 and on its elevating face, by any convenient means of attachment such as a screw $a'$, all as shown on a larger scale in Figs. 2 and 3. This strip may be provided with a rounded and roughened or corrugated face as shown in Fig. 3.

I have used this device, substantially as shown and described, on a number of green pea viners in actual operation in canning factories and have found an improvement in action. In the preferred form of my invention the ease with which the beads or strips can be attached to the elevating ribs of viners in the field by merely taking off the detachable frame carrying the sieve 2, the facility with which strips of different cross sectional shapes can be secured to the rib of such viners in the field so as to have the rib shape suit the variety of vines being operated on, and the simplicity and low cost of building new viners with my attached bead are features of my invention.

I claim:

A green pea viner comprising the combination of a slowly revolving drum having inwardly projecting lifting ribs with beads secured to their lifting faces at their inner ends and a rapidly revolving beater-carrying prism substantially as described.

In testimony whereof, I have signed my name to this specification, in the presence of two subscribing witnesses.

WILLIAM McDONALD.

Witnesses:
H. W. NINABUCK.
FRANK H. COPELAND.